United States Patent [19]

Koike

[11] Patent Number: 4,771,740
[45] Date of Patent: Sep. 20, 1988

[54] INTAKE SYSTEM FOR INTERNAL COMBUSTION ENGINE

[75] Inventor: Masamitsu Koike, Hiroshima, Japan

[73] Assignee: Mazda Motor Corporation, Japan

[21] Appl. No.: 32,558

[22] Filed: Apr. 1, 1987

[30] Foreign Application Priority Data

Apr. 3, 1986 [JP] Japan .............................. 61-50033[U]
Jun. 30, 1986 [JP] Japan .................................. 61-153778

[51] Int. Cl.⁴ ............................................ F02M 31/00
[52] U.S. Cl. ................................................ 123/52 MB
[58] Field of Search ......... 123/52 M, 52 MC, 52 MB, 123/52 MV, 52 ML, 432

[56] References Cited

U.S. PATENT DOCUMENTS

| | | | |
|---|---|---|---|
| 3,814,069 | 6/1974 | Croft et al. | 123/52 MF |
| 4,323,038 | 4/1982 | Motosugi et al. | 123/52 MB |
| 4,679,531 | 7/1987 | Hitomi et al. | 123/52 MB |

FOREIGN PATENT DOCUMENTS

| | | |
|---|---|---|
| 53-4007 | 1/1978 | Japan . |
| 54-137516 | 10/1979 | Japan .............................. 123/52 MB |
| 56-115819 | 9/1981 | Japan . |
| 57-52651 | 3/1982 | Japan .............................. 123/52 M |
| 59-126028 | 7/1984 | Japan .............................. 123/52 MB |
| 60-164619 | 8/1985 | Japan . |

Primary Examiner—Charles J. Myhre
Assistant Examiner—David A. Okonsky
Attorney, Agent, or Firm—Gerald J. Ferguson, Jr.

[57] ABSTRACT

An intake system for an internal combustion engine having a plurality of cylinders comprises a plurality of discrete intake passages respectively connected to the cylinders at the downstream ends, an interconnecting passage provided to communicate the discrete intake passages with each other, a butterfly valve disposed at each junction of the interconnecting passage with the discrete intake passages to move between a full open position and a closing position and an actuator which moves the butterfly valves according to the engine operating condition. Each of said butterfly valves is mounted to extend inclined toward the direction of flow of intake air in the discrete intake passage with respect to the central axis of the interconnecting passage in the full open position thereof.

11 Claims, 3 Drawing Sheets

INTAKE SYSTEM FOR INTERNAL COMBUSTION ENGINE

BACKGROUND OF THE INVENTION

1. Field of the Invention

This invention relates to an intake system for an internal combustion engine, and more particularly to an intake system for an internal combustion engine in which the engine output power is improved by the kinetic effect of intake air.

2. Description of the Prior Art

As is well known, a negative pressure wave generated in an intake system of an internal combustion engine upon the initiation of each intake stroke is propagated upstream of the intake system and is then reflected at an end of the system opening to the atmosphere or to a surge tank disposed on an upstream side of the intake system toward the intake port as a positive pressure wave. By arranging the intake system so that the positive pressure wave reaches the intake port immediately before closure of the intake valve to force intake air into the combustion chamber, the volumetric efficiency can be improved. There have been known various intake systems in which such inertia effect or resonance effect of intake air is used for improving the volumetric efficiency. However, the period of vibration of the pressure wave in the intake passage can be matched with the period of opening and closure of the intake valve to obtain a sufficient inertia effect of the intake air only within a limited engine speed range which depends upon the shape of the intake passage. There has been proposed an intake system in which, for instance, the length of the intake passage is changed according to the engine speed in order to obtain an inertia effect of intake air over a wider engine speed range. For example, in the intake system disclosed in Japanese Unexamined Patent Publication No. 56(1981)-115819, each of the discrete intake passage portions leading to the respective combustion chambers is bifurcated to form a long passage portion and a short passage portion both opening to a surge tank or the like at the upstream end, and an on-off valve is provided in the short passage portion to open the short passage portion in a high engine speed range to shorten the effective length of the discrete intake passage portion, thereby obtaining a sufficient inertia effect of intake air in the high engine speed range in addition to that in the low engine speed range.

In the intake system described above, the volumetric efficiency for one cylinder is improved by the inertia effect of intake air generated by pressure propagation only in the discrete intake passage portion leading to the cylinder. If the pressure propagation in the discrete intake passages leading to other cylinders can be effectively utilized, a further improvement in the volumetric efficiency will be obtainable.

Thus, we have disclosed in our U.S. patent application Ser. No. 795443, an intake system for a multicylinder internal combustion engine in which the inertia effect of intake air can be effectively utilized to improve the volumetric efficiency in both the low engine speed range and the high engine speed range, and at the same time, the inertia effect of intake air in each discrete intake passage portion can be enhanced by the pressure wave in at least one of the other discrete intake passage portions especially in high engine speed ranges.

The intake system has an intake passage comprising a common passage portion opening to the atmosphere, a surge tank connected to the downstream end of the common passage portion and a plurality of discrete passage portions branching from the surge tank and respectively connected to the cylinders. At least one interconnecting passage is provided to communicate each of the discrete passage portions with at least one of the other discrete passage portions at a portion downstream of the surge tank, and a butterfly valve is disposed at each junction of the interconnecting passage with the discrete passage portions to open and close each junction. The on-off valve is opened at least when the engine speed exceeds a predetermined speed.

In this intake system, in the low engine speed range lower than the predetermined speed, the butterfly valves are closed and intake air is introduced into each combustion chamber by way of an effectively longer passage including the part of each discrete passage portion between the surge tank and the junction of the discrete passage portion and the interconnecting passage so that the period of the vibration of the pressure wave in the intake passage can be matched with the period of opening and closure of the intake valve to obtain a sufficient inertia effect of intake air in the low engine speed range. On the other hand when the butterfly valve is opened in the high engine speed range, the negative pressure wave generated upon initiation of each intake stroke in each of the combustion chambers and propagated upstream of the discrete passage portion corresponding thereto is reflected at the junction of the discrete passage with the interconnecting passage as a positive pressure wave toward the combustion chamber to force intake air into the combustion chamber and at the same time the pressure wave(s) from the other discrete passage portion(s) connected to the discrete passage portion by way of the interconnecting passage is propagated thereto to further improve the volumetric efficiency.

Generally, when a butterfly valve is provided in a passage, the butterfly valve is mounted to extend on the central axis of the passage in the full open position thereof.

However, in the intake system, since the butterfly valve is provided in the interconnecting passage at the junction of the interconnecting passage to the discrete passage portion so that the volume of the interconnecting passage does not affect the effective length of the discrete passage portion when the butterfly valve is closed, if the butterfly valve is mounted to extend on the central axis of the interconnecting passage in the full open position thereof, intake air flows into the downstream portion of the discrete passage portion along the butterfly valve at an angle of the junction of the interconnecting passage to the discrete passage portion, thereby increasing the energy loss at the junction and adversely affecting the propagation of the pressure wave between the interconnecting passage and the discrete passage portion to lower the inertia effect of intake air.

SUMMARY OF THE INVENTION

In view of the foregoing observations and description, the primary object of the present invention is to provide an intake system of the type described above in which flow of intake air and propagation of the pressure wave when the butterfly valve is full open are further improved.

In accordance with the present invention, there is provided an intake system for an internal combustion engine having a plurality of cylinders comprising a plurality of discrete intake passages respectively connected to the cylinders at the downstream ends; at least one interconnecting passage provided to communicate each of the discrete intake passages with at least one of the other discrete intake passages, a butterfly valve disposed at each junction of the interconnecting passage with the discrete intake passages to move between a full open position and a closing position; and an actuator which moves the butterfly valves according to the engine operating condition, each of said butterfly valves being mounted to extend inclined toward the direction of flow of intake air in the discrete intake passage with respect to the central axis of the interconnecting passage in the full open position thereof.

In the intake system of the present invention, since the butterfly valve is mounted to extend inclined toward the direction of flow of intake air in the discrete intake passage in the full position thereof, intake air from the interconnecting passage flows into the discrete intake passage after being deflected in the direction of flow of intake air in the discrete intake passage under the guidance of the butterfly valve, whereby flow of intake air in the discrete passage and propagation of the pressure wave between the interconnecting passage and the discrete intake passage become better, whereby the inertia effect of intake air is enhanced.

DESCRIPTION OF THE PREFERRED EMBODIMENT

Figure 1:
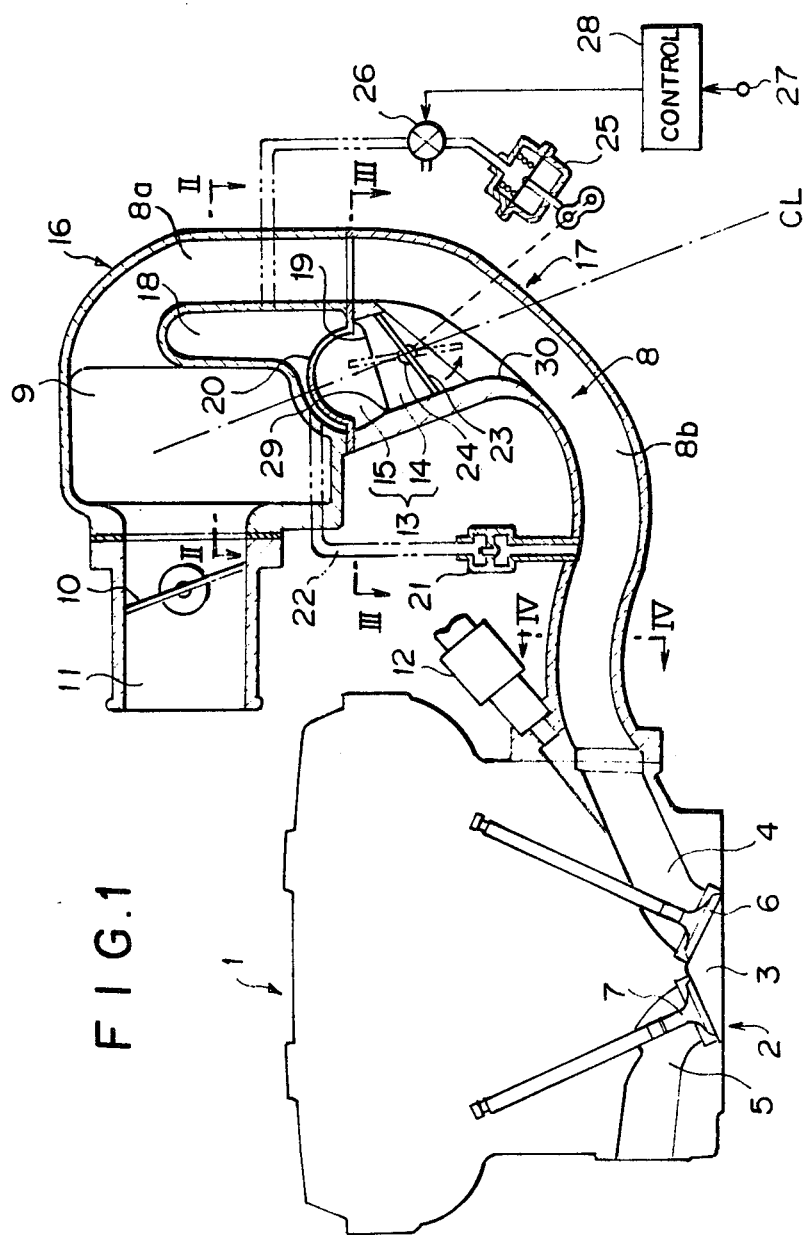
FIG. 1 is a cross-sectional view showing a four cylinder engine provided with an intake system in accordance with an embodiment of the present invention.
Figure 2:
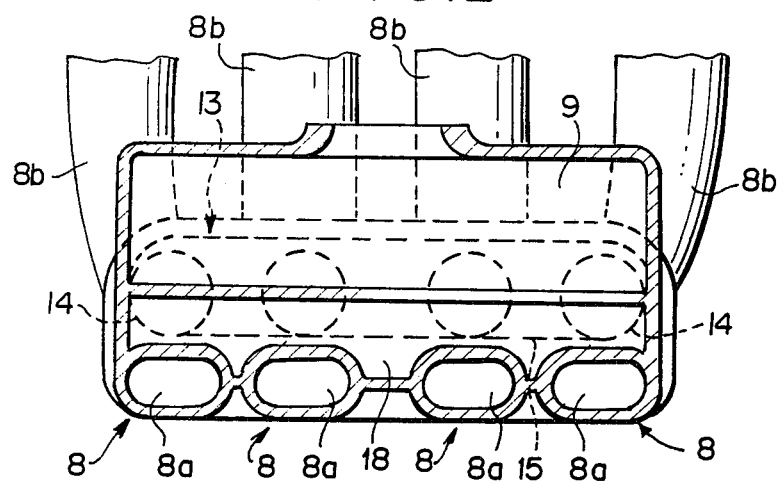
FIG. 2 is a cross-sectional view taken along line II—II in FIG. 1.
Figure 3:
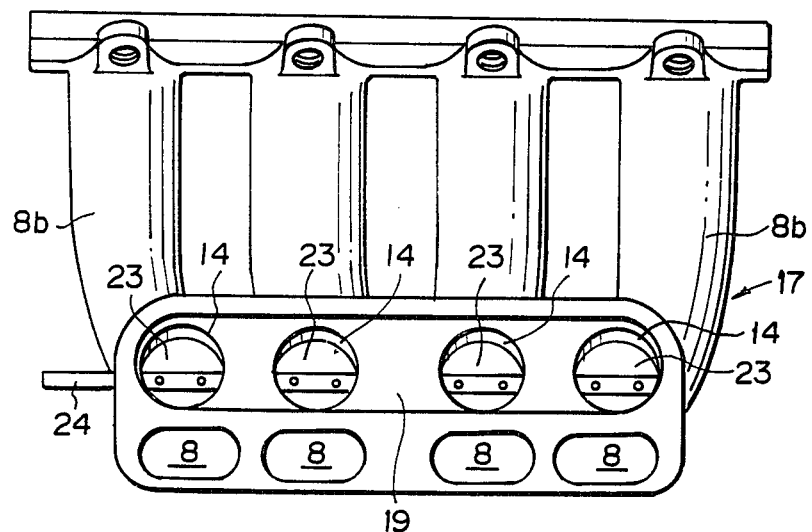
FIG. 3 is a cross-sectional view taken along line III—III in FIG. 1.
Figure 4:
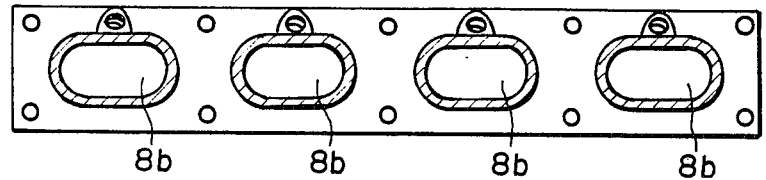
FIG. 4 is a cross-sectional view taken along line IV—IV in FIG. 1.
Figure 5:
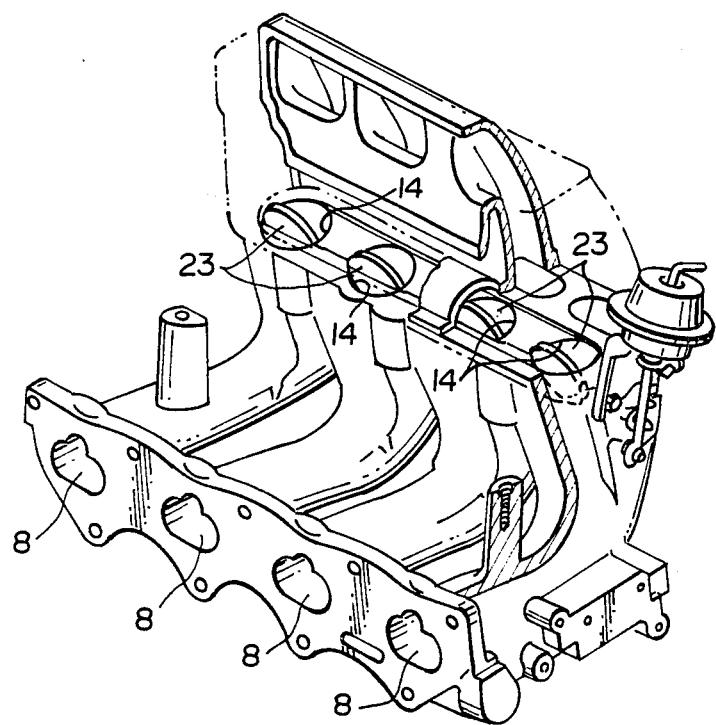
FIG. 5 is a perspective view showing a part of the engine.

In FIGS. 1 to 5, an internal combustion engine 1 provided with an intake system in accordance with an embodiment of the present invention has first to fourth cylinders 2. In each cylinder 2, a combustion chamber 3 is defined above a piston (not shown), and an intake port 4 and an exhaust port 5 open to the combustion chamber 3. The intake port 4 and the exhaust port 5 are respectively provided with an intake valve 6 and an exhaust valve 7.

To the intake port 4 of each cylinder 2 is connected the downstream end of a discrete intake passage 8 which is provided for each cylinder separately from the other cylinders. The upstream end portion of each discrete intake passage 8 extends outwardly from the engine 1 and is bent upward to be communicated with a surge tank 9 which extends in parallel to the row of the cylinders 2 or the crankshaft and is substantially rectangular in cross section. The discrete intake passages 8 are substantially equal to each other in length, and the length of each discrete intake passage 8 is selected so that a sufficient inertia effect to intake air can be obtained in a relatively low engine speed range. Intake air is introduced into the surge tank 9 by way of a common intake passage 11 provided with a throttle valve 10. Further, a fuel injection valve 12 is disposed in each discrete intake passage 8 near the downstream end thereof.

An interconnecting portion 13 is connected to the discrete intake passages 8 at intermediate portions thereof and is communicated with the respective discrete intake passages 8 to mutually communicate the discrete intake passages 8. The interconnecting portion 13 comprises port portions 14 branching from the respective discrete intake passages 8 and an interconnecting passage 15 which extends in parallel to the surge tank 9 to mutually connect the port portions 14.

In this particular embodiment, the whole intake manifold is divided into upper and lower halves 16 and 17. The upper half 16 comprises the surge tank 9 and the upstream portions 8a of the discrete intake passages 8 integrally formed with each other with a space 18 open downward therebetween. The lower half 17 comprises the downstreax portions 8b of the discrete intake passages 8 and the port portions 14 of the interconnecting portion 13 formed integrally with each other with a recess 19 formed on the upper side to beopposed to the space 18, the port portions 14 opening to the recess 19. The upper and lower halves 16 and 17 are connected together with a partition plate 20 which also functions as a gasket sandwiched therebetween. The partition plate 20 curves upward at a portion opposed to the recess 19, thereby forming the interconnecting passage 15 therebetween. The space 18 above the partition plate 20 is communicated with the discrete intake passage 8 by way of a passage 22 provided with a check valve 21 and functions as a vacuum chamber for storing intake vacuum.

Each port portion 14 of the interconnecting portion 13 is provided with a butterfly valve 23. The butterfly valves 23 are fixed to a valve shaft 24 to be opened and closed by a diaphragm type actuator 25 which is connected to the space (the vacuum chamber) 18 by way of a three-way solenoid valve 26. The atmospheric pressure or the intake vacuum is selectively applied to the actuator 25 by a control signal output to the three-way solenoid valve 26 from a control unit 28 which receives an engine rpm signal 27 so that the butterfly valves 23 are closed when the engine rpm is lower than a preset value and are moved in the direction of the arrow in FIG. 1 to be opened when the engine rpm is not lower than the preset value. Each butterfly valve 23 is mounted in the port portion 14 to extend inclined with respect to the central axis $C_L$ of the port portion 14 in the downstream direction of intake air flow in the full open position thereof as shown by the broken line in FIG. 1. Accordingly, when the butterfly valve 23 is opened to the full open position in the high engine speed range, intake air flows into the discrete intake passage 8 from the port portion 14 after being deflected in the downstream direction of intake air flow by the butterfly valve 23.

In this embodiment, the discrete intake passage 8 has a relatively small cross section in order to increase the flow speed of intake air in the low engine speed range, and the effective cross-sectional area of the interconnecting portion 13 is larger than the cross-sectional area of the discrete intake passage 8. More particularly, the cross-sectional area $Ap_1$ of the portion 8a of the discrete intake passage 8 upstream of the junction of the port portion 14 is smaller than the cross-sectional area $Ap_2$ of the portion 8b of the discrete intake passage 8 downstream of the junction of the port portion 14. At the same time, the effective cross-sectional area As of the port portion 14 is larger than the cross-sectional area $Ap_2$ of the downstream portion 8b of the discrete intake passage 8, and the cross-sectional area Ar of the interconnecting passage 15 of the interconnecting portion 13 is larger than the effective cross-sectional area As of the port portion 14. That is, the cross-sectional areas become smaller in the order of $Ap_1$- $Ap_2$- As - Ar.

The term "the effective cross-sectional area of the port portion 14" means the cross-sectional area of the port portion 14 less the cross-sectional area occupied by the valve shaft 24 and the butterfly valve 23 when the butterfly valve 23 is in the full open position.

The wall surface 29 of the portion where the port portion 14 opens to the interconnecting passage 15 and the wall surface 30 of the portion where the port portion 14 merges into the downstream portion 8b of the discrete intake passage 8 are curved so that intake air flows smoothly.

With the arrangement described above, in the state in which the butterfly valves 23 are closed and the communication between the discrete intake passages 8 is broken, the negative pressure wave generated in the intake stroke is propagated to the surge tank 9 and reflected by the surge tank 9. That is, the negative pressure wave and the reflected pressure wave are propagated over a relatively long distance, and the vibration frequenc of the pressure wave thus obtained is matched with the opening and closing cycle of the intake valve 6 in the low engine speed range, whereby the volumetric efficiency can be improved by inertia effect of intake air.

On the other hand, in the state in which the butterfly valves 23 are opened and the discrete intake passages 8 are communicated with each other by way of the interconnecting portion 13, the negative pressure wave generated in the intake stroke is reflected at the interconnecting portion 13. That is, the distance over which the negative pressure wave and the reflected pressure wave are propagated is shortened, thereby enhancing the inertia effect of intake air in the high engine speed range. Further, the pressure waves propagated to each discrete intake passage 8 from the other discrete intake passages through the interconnecting portion 13 also contribute to enhancement of the inertia effect of intake air.

Further, in this embodiment, by virtue of the orientation of the butterfly valve 23, intake air smoothly flows into the discrete intake passage 8 from the interconnecting portion 13 to further enhance the inertia effect of intake air. Further, since the discrete intake passage 8 solely through which intake air flows in the low engine speed range is relatively small in cross section, the flow speed of intake air is increased to enhance the inertia effect of intake air in the low engine speed range where the amount of intake air is small. On the other hand, in the high engine speed range where the amount of intake air is large, intake air flows into the downstream portion 8b of the discrete intake passage 8 through the interconnecting portion 13 in addition to from the upstream portion 8a, whereby sufficient amount of intake air can be introduced into the cylinder 2 in the intake stroke. In this case, since the effective cross-sectional area of the interconnecting portion 13 is larger than that of the discrete intake passage 8, the flow resistance of intake flowing through the interconnecting portion 13 is reduced. The cross-sectional area of the downstream portion 8b of the discrete intake passage 8 is made somewhat larger than that of the upstream portion 8a in order to satisfy intake air amount requirement in the high engine speed range. However, when the cross-sectional area of the downstream portion 8b is excessively large, the flow speed of intake air in the low engine speed range is lowered. On the other hand, since the interconnecting portion 13 is closed in the low engine speed range, the cross-sectional area of the interconnecting portion 13 may be enlarged without possibility of reduction in the flow speed of intake air in the low engine speed range.

As described above, the cross-sectional area of the interconnecting passage 15 of the interconnecting portion 13 is larger than the effective cross-sectional area of the port portion 14. This is for compensating for reduction of the effective area of the interconnecting passage 15 due to bend at the junction of the port portion 14 and the interconnecting passage 15.

I claim:

1. An intake system for an internal combustion engine having a plurality of cylinders comprising a plurality of discrete intake passages respectively connected to the cylinders at the downstream ends, at least one interconnecting passage provided to communicate each of the discrete intake passages with at least one of the other discrete intake passages, said interconnecting passage including port portions, a butterfly valve disposed at each junction of the interconnecting passage with the discrete intake passages including port portions to move between a full open position and a closing position, and an actuator which moves the butterfly valves according to the engine operating condition, characterized in that each of said butterfly valves is mounted to extend inclined toward the direction of flow of intake air in the discrete intake passage with respect to the central axis of the interconnecting passage in the full open position thereof;

each of said plurality of discrete intake passages having (a) an upstream portion which has a predetermined first cross-sectional area and which is upstream of each respective said junction and (b) a downstream portion which has a predetermied second cross-sectional area and which is downstream of each said junction; each of said port portions having a predetermined effective third cross-sectional area;

said third cross-sectional area being larger than said second cross-sectional area, and said second cross-sectional area being larger than said first cross-sectional area.

2. An intake system as defined in claim 1, in which said interconnecting passage comprises a volume portion communicated with the port portions, the cross-sectional area of the volume portion being larger than said effective third cross-sectional area.

3. An intake system as defined in claim 1 in which said discrete intake passages are bent upward and communicated with a surge tank extending in the direction of the row of the cylinders.

4. An intake system as defined in claim 3 in which said surge tank is substantially rectangular in cross section and the discrete intake passages are connected to the upper portion of the side wall of the surge tank, said interconnecting passage being disposed in the space formed between said side wall of the surge tank and the discrete intake passages.

5. An intake system as defined in claim 3 in which said interconnecting passage is formed on the inner side of the discrete intake passages and below the surge tank.

6. An intake system as defined in claim 1 in which said interconnecting passage comprises said port portions branching off from the respective discrete intake passages and a volume portion communicated with the port portions, said butterfly valves being provided in the port portions.

7. An intake system as defined in claim 6 in which said discrete intake passages are bent upward and communicated with a surge tank extending in the direction of the row of the cylinders, and said volume portion is integrally formed on the inner side of the discrete intake passages and below the surge tank.

8. An intake system as defined in claim 6 in which the cross-sectional area of the volume portion is larger than the effective said third cross-sectional area of the port portion.

9. An intake system as defined in claim 1 in which said butterfly valve is closed in a low engine speed range and is opened in a high engine speed range.

10. An intake system as defined in claim 1 in which said discrete intake passages are connected to a surge tank at the upstream ends thereof, and the surge tank, the upper portion of the discrete intake passages, the upper portion of the interconnecting passage are integrally formed, while the lower portion of the discrete intake passages and the lower portion of the interconnecting passage is integrally formed, the upper portion of the discrete intake passages being formed to conform to the shape of the side surface of the surge tank.

11. An intake system for an internal combustion engine having a plurality of cylinders comprising a plurality of discrete intake passages respectively connected to the cylinders at the downstream ends, at least one interconnecting passage provided to communicate each of the discrete intake passages with at least one of the other discrete intake passages, said interconnecting passage including port portions, a butterfly valve disposed at each junction of the interconnecting passage with the discrete intake passages to move between a full open position and a closing position, and an actuator which moves the butterfly valves according to the engine operating condition, characterized in that each of said butterfly valves is mounted to extend inclined toward the direction of flow of intake air in the discrete intak passage with respect to the central axis of the interconnecting passage in the full open position thereof;

each of said plurality of discrete intake passages having (a) an upstream portion which has a predetermined first cross-sectional area and which is upstream of each respective said junction and (b) a downstream portion which has a predetermined second cross-sectional area and which is downstream of each said junction; each of said port portions having a predetermined effective third cross-sectional area;

said third cross-sectional area being larger than said second cross-sectional area, and said second cross-sectional area being larger than said first cross-sectional area;

(i) a surge tank disposed upstream of the plurality of discrete intake passages, (ii) the downstream portion of each of the discrete intake passages between the interconnection passage and the cylinder having a predetermined length such that an air inertia effect occurs at the high engine speed range, and the discrete intake passage having a selected length from the surge tank to the cylinder such that an air inertia effect is obtained at the low engine speed range;

control means closing the butterfly valves at the low engine speed range so as to introduce intake air solely through the discrete passage portions, while the high engine speed range intake air is introduced through both the discrete passage portions and the interconnecting passage means;

a negative pressure wave generated upon initiation of an intake stroke being reflected at the surge tank as a positive pressure wave at the low engine speed range, and said negative pressure wave being reflected at the interconnecting passage means at the high engine speed range.

* * * * *